(12) United States Patent
Sano et al.

(10) Patent No.: US 8,379,005 B2
(45) Date of Patent: Feb. 19, 2013

(54) LIQUID CRYSTAL DISPLAY DEVICE UTILIZING A PHOTOSENSOR

(75) Inventors: Yutaka Sano, Tottori (JP); Takashi Kunimori, Tottori (JP); Masanori Yasumori, Tottori (JP); Toshihiko Tanaka, Tottori (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 11/510,557

(22) Filed: Aug. 28, 2006

(65) Prior Publication Data

US 2007/0046619 A1     Mar. 1, 2007

(30) Foreign Application Priority Data

Aug. 31, 2005  (JP) ................... 2005-250738
Oct. 6, 2005   (JP) ................... 2005-293985
Oct. 18, 2005  (JP) ................... 2005-302746

(51) Int. Cl.
    G06F 3/038   (2006.01)
    G09G 3/36    (2006.01)
    G02F 1/133   (2006.01)

(52) U.S. Cl. ............. 345/207; 345/102; 349/116

(58) Field of Classification Search .......... 345/48, 345/77, 84, 88–90, 100, 102, 204, 207; 313/504, 313/506; 257/40, 79, 124, 228, 257–258, 257/277, 414; 349/61, 116–118
See application file for complete search history.

(56) References Cited

U.S. PATENT DOCUMENTS

| | | | | |
|---|---|---|---|---|
| 5,619,221 A * | 4/1997 | Hirai et al. | ........ | 345/58 |
| 6,392,728 B2 * | 5/2002 | Tanaka et al. | ........ | 349/106 |
| 6,566,685 B2 * | 5/2003 | Morikawa et al. | ........ | 257/59 |
| 6,975,008 B2 * | 12/2005 | Cok | ........ | 257/414 |
| 7,218,048 B2 * | 5/2007 | Choi et al. | ........ | 313/504 |
| 7,260,422 B2 * | 8/2007 | Knoedgen | ........ | 455/569.1 |
| 7,288,753 B2 * | 10/2007 | Cok | ........ | 250/214 R |

(Continued)

FOREIGN PATENT DOCUMENTS

JP     04-252923     9/1992
JP     05-083659     4/1993

(Continued)

OTHER PUBLICATIONS

Japanese Office Action issued on Jul. 20, 2010 for corresponding Japanese patent application 2005-250738.

(Continued)

*Primary Examiner* — Bipin Shalwala
*Assistant Examiner* — Keith Crawley
(74) *Attorney, Agent, or Firm* — K&L Gates LLP

(57) ABSTRACT

A liquid crystal display device 1 having a liquid crystal display panel and an illuminating means controlled according to the output of the light sensing component. The light sensing component is deployed at the periphery of the TFT substrate's display area DA and uses a thin film transistor as photosensor. A capacitor C is connected between source and drain electrodes $S_L$, $D_L$ for such TFT photosensor. One of the capacitor's terminals is connected to a standard voltage source $V_S$ via a switch element SW, and the other to the common electrode 26. Voltage that is always lower than the voltage applied to the common electrode by an amount corresponding to a reverse bias voltage is applied to the gate electrode $G_L$ for the TFT photosensor. The capacitor's voltage a certain time after the switch element turns off is output.

17 Claims, 13 Drawing Sheets

U.S. PATENT DOCUMENTS

| | | | |
|---|---|---|---|
| 7,538,305 B2 * | 5/2009 | Shin | 250/205 |
| 2004/0113877 A1 * | 6/2004 | Abileah et al. | 345/92 |
| 2004/0263460 A1 * | 12/2004 | Lu | 345/98 |
| 2005/0067553 A1 | 3/2005 | Agari et al. | |
| 2005/0134548 A1 * | 6/2005 | Kim et al. | 345/102 |
| 2006/0274023 A1 * | 12/2006 | Sultenfuss et al. | 345/102 |
| 2008/0291195 A1 * | 11/2008 | Lee et al. | 345/214 |

FOREIGN PATENT DOCUMENTS

| | | |
|---|---|---|
| JP | 2001-350158 A | 12/2001 |
| JP | 2002-043610 | 2/2002 |
| JP | 2002-131719 A | 5/2002 |
| JP | 2002-131742 A | 5/2002 |
| JP | 2002-196311 | 7/2002 |
| JP | 2003-140631 | 5/2003 |
| JP | 2003-161926 | 6/2003 |
| JP | 2003-215534 A | 7/2003 |
| JP | 2004-7237 A | 1/2004 |
| JP | 2004-165386 | 6/2004 |
| WO | 03/050602 | 6/2003 |
| WO | 2005/045380 | 5/2005 |

OTHER PUBLICATIONS

Japanese Office Action issued on Oct. 12, 2010, for corresponding Japanese Patent Application No. 2005-293985.

* cited by examiner

LIQUID CRYSTAL DISPLAY DEVICE UTILIZING A PHOTOSENSOR

FIELD OF THE INVENTION

The present invention relates to a liquid crystal display device. More particularly, it relates to a liquid crystal display device having a backlight, frontlight or similar light source, wherein the brightness of the light source can be varied according to the brightness of the external light.

BACKGROUND OF THE INVENTION

Over recent years the use of liquid crystal display devices has spread rapidly not only in information and telecommunications equipment but in electrical equipment in general. Especially in mobile equipment, use is often made, in order to reduce power consumption, of the reflective type of liquid crystal display device, which does not require a backlight or sidelight as the transmissive type does. (Below, "backlight, etc." is used to include both backlight and sidelight.) However, reflective liquid crystal display devices take the external light as their light source and consequently are poorly visible in dark places such as room interiors. Accordingly, recent times have seen the development of liquid crystal display devices that use a frontlight (disclosed in Japanese Laid-Open Patent Publication No. 2002-131742) or that combine qualities of both the transmissive type and the reflective type (disclosed in Japanese Laid-Open Patent Publication No. 2001-350158).

A reflective liquid crystal display device employing a frontlight is able, for example, to display images in dark places by lighting up the frontlight, while in light places it can utilize the external light to display images, without lighting up the frontlight. Hence there is no need to keep the frontlight permanently lit, which means that the power consumption can be drastically reduced. A semi-transmissive liquid crystal display device has within each of its pixels a transmissive portion equipped with a transparent electrode and a reflective portion equipped with a reflective electrode, and hence is able to display images in dark places by lighting up its backlight, etc., and making use of the transmissive portions of its pixel areas, while in light places it can utilize external light at its reflective portions to display images, without lighting up the backlight, etc. Thus with this type too there is the merit that the power consumption can be drastically lowered as the backlight, etc., does not need to be permanently lit.

In reflective and semi-transmissive liquid crystal display devices such as described above, the visibility of the liquid crystal display screen will vary with the intensity of the external light. This means that in order to obtain good visibility of the liquid crystal display screen, the end users must themselves perform the bothersome tasks of deciding whether or not the external light intensity is at a level where the backlight, etc., or frontlight should be lit, and of lighting, turning down or turning off the backlight, etc., or frontlight accordingly. There is also the prominent problem that in some cases the backlight, etc., or frontlight will be lit unnecessarily when the external light is of ample brightness, which will increase wasteful power consumption so that in mobile equipment such as mobile telephones the battery will become depleted early.

A well-known related art invention deals with such problems by providing the liquid crystal display device with photosensors; the brightness of the external light is sensed by the photosensors and the backlight, etc., is controlled to turn on and off according to the results of such sensing (disclosed in Japanese Laid-Open Patent Publication No. 2002-131719).

The liquid crystal display device set forth in disclosed in Japanese Laid-Open Patent Publication No. 2002-131719 below deploys, on a substrate of the liquid crystal display panel, a light sensing component that has a photosensor. A thin film transistor (TFT) is used as the photosensor. This TFT is created simultaneously with the liquid crystal display panel's TFTs. Via detection of the TFT photosensor's photosensor's light leakage current, the backlight is automatically turned on and off according to the ambient brightness.

Another liquid crystal display device, set forth in disclosed in Japanese Laid-Open Patent Publication No. 2003-215534 below, uses a photodiode as photosensor and, according to the ambient brightness, supplies current of assured temperature to a light-emitting diode serving as backlight.

A further device, set forth in disclosed in Japanese Laid-Open Patent Publication No. 2004-007237 below, makes a light-emitting diode serving as backlight or operation indicating means for the equipment serve also as a photosensor, and controls lighting of the backlight by using for the light-emitting diode the electromotive force appropriate to the ambient brightness.

SUMMARY OF THE INVENTION

The present invention was accomplished in order to resolve the aforementioned difficulties, and has the purpose of providing a liquid crystal display device in which the light sensing component incorporated in the liquid crystal display panel is not susceptible to the influence of the drive signals for the display panel.

Another purpose of the present invention is to provide a liquid crystal display device in which the light sensing component incorporated in the liquid crystal display panel does not induce deterioration of the liquid crystals.

A further purpose of the present invention is to provide a liquid crystal display device in which fluctuation in the characteristics of the photosensor is corrected so that the backlight, etc., can be automatically controlled to turn on and off at a particular predetermined brightness, and furthermore the end user can set automatic on/off control of the backlight, etc., using any desired ambient brightness.

The above purposes of the present invention can be achieved by means of the structures that will now be described. Namely, the liquid crystal display device of a first mode of the present invention is equipped with:

a liquid crystal display panel in which a liquid crystal layer is provided between an active matrix substrate and a color filter substrate that has a common electrode;

a light sensing component that has a photosensor that senses external light; and an illuminating means that is controlled according to the output of the light sensing component;

and the device has the features that the light sensing component is deployed at the periphery of the display area of the active matrix substrate; a thin film transistor is used as the photosensor; a capacitor is connected between the source and drain electrodes for such thin film transistor; a voltage that is always lower than the voltage applied to the common electrode by an amount corresponding to a reverse bias voltage is applied to the gate electrode of the thin film transistor; and one of the capacitor's terminals is connected to a standard voltage source via a switch element while the other terminal is connected to the common electrode, so that the external light can be sensed by detecting the capacitor's voltage a certain time after the switch element is switched off.

In such liquid crystal display device of the first mode of the present invention, the thin film transistor, capacitor and switch element of the light sensing component will preferably be integrated on the display panel.

In such liquid crystal display device of the first mode of the present invention, the light sensing component's capacitor will preferably be provided inside the display panel, while the switch element will preferably be deployed exterior to the display panel.

In such liquid crystal display device of the first mode of the present invention, the photosensor will preferably be equipped with a completely shielded photosensor and an unshielded photosensor, and the difference between the outputs of the completely shielded and the unshielded photosensors will be used as the output of the photosensor.

In such liquid crystal display device of the first mode of the present invention, the thin film transistor serving as the photosensor can be formed simultaneously during the manufacturing process with the thin film transistors for the liquid crystal display panel formed on the active matrix substrate.

In such liquid crystal display device of the first mode of the present invention, a voltage that varies in a rectangular pattern with a particular period may be applied to the common electrode.

In such liquid crystal display device of the first mode of the present invention, a voltage that varies in a rectangular pattern and is of the same magnitude as the voltage applied to the common electrode will preferably be applied to the gate electrode.

In such liquid crystal display device of the first mode of the present invention, a control means having a threshold memorizer and a comparison component will preferably be connected to the light sensing component. With such control means, in the regular operation mode the output of the light sensing component and the threshold value stored in the threshold memorizer will be compared in the comparison component and on/off control of the illuminating means will be performed according to the results of such comparison, while in the initial setting mode, light serving as a standard will be shone continuously at the photosensor and the resulting output of the light sensing component will be stored in the threshold memorizer.

In such liquid crystal display device of the first mode of the present invention, the threshold memorizer and comparison component will preferably be provided inside the driver IC placed at the periphery of the active matrix substrate.

The liquid crystal display device of a second mode of the present invention is equipped with:

a liquid crystal display panel in which a liquid crystal layer is provided between an active matrix substrate and a color filter substrate that has a common electrode;

a light sensing component that has a photosensor that senses external light; and an illuminating means that is controlled according to the output of the light sensing component;

and the device has the features that the light sensing component is deployed at the periphery of the display region of the active matrix substrate; a thin film transistor is used as the photosensor; a capacitor is connected between the source and drain electrodes for such thin film transistor; one of the capacitor's terminals is connected to a first and a second standard voltage source via a first and a second switch element while the other terminal is connected to the common electrode; a voltage that is always lower than the voltage applied to the common electrode by a particular amount corresponding to a reverse bias voltage is applied to the gate electrode of the thin film transistor; and alternately with each fixed-length frame period the first or second switch element is activated briefly so as to apply standard voltage from the first or second standard voltage source to charge the capacitor, thus enabling external light to be sensed by detecting the capacitor's voltage a certain time after the first and second switch elements are switched off.

In such liquid crystal display device of the second mode of the present invention, the thin film transistor, capacitor and switch elements of the light sensing component will preferably be integrated on the display panel.

In such liquid crystal display device of the second mode of the present invention, the light sensing component's capacitor will preferably be provided inside the display panel, while the switch elements will preferably be deployed exterior to the display panel.

In such liquid crystal display device of the second mode of the present invention, the switch elements will preferably be provided inside the driver IC placed at the periphery of the active matrix substrate.

In such liquid crystal display device of the second mode of the present invention, the photosensor will preferably be equipped with a completely shielded photosensor and an unshielded photosensor, and the difference between the outputs of the completely shielded and the unshielded photosensors will be used as the output of the photosensor.

In such liquid crystal display device of the second mode of the present invention, a voltage that varies in a rectangular form with a particular period will preferably be applied to the common electrode.

In such liquid crystal display device of the second mode of the present invention, the thin film transistor serving as the photosensor can be formed simultaneously during the manufacturing process with the thin film transistors for the switching elements of the liquid crystal display panel formed on the active matrix substrate.

In such liquid crystal display device of the second mode of the present invention, the fixed-length frame period will preferably be an integer multiple of the vertical scan period in the drive signal for the liquid crystal display panel.

In such liquid crystal display device of the second mode of the present invention, control will preferably be implemented so that the first and second standard voltage sources will respectively supply standard voltage that is positive and standard voltage that is negative, relative to the voltage applied to the common electrode, and the first and second switch elements will apply the positive standard voltage to the capacitor when the voltage supplied to the common electrode is low level, and will apply the negative standard voltage to the capacitor when the voltage supplied to the common electrode is high level.

In such liquid crystal display device of the second mode of the present invention, the first and second standard voltage sources will preferably each supply a voltage that is intermediate between the high level and low level voltages applied to the common electrode.

In such liquid crystal display device of the second mode of the present invention, a control means having a threshold memorizer and a comparison component will preferably be connected to the light sensing component. With such control means, in the regular operation mode the output of the light sensing component and the threshold value stored in the threshold memorizer will be compared in the comparison component and on/off control of the illuminating means will be performed according to the results of such comparison, while in the initial setting mode, light serving as a standard will be shone continuously at the photosensor and the resulting output of the light sensing component will be stored in the threshold memorizer.

Thanks to possessing the above structure, the present invention exerts outstanding beneficial effects that will now be described. Namely, according to the liquid crystal display device of the first mode of the present invention, the light sensing component's ground terminal is connected to the color filter substrate's common electrode, and the common electrode voltage, that is, the voltage applied to the common electrode, is utilized for activation of the light sensing component. Thus, no ground electrode or other new electrode needs to be provided, as the liquid crystal display panel's common electrode can either be utilized unchanged to also serve the purpose of such an electrode, or be extended as far as the area where the light sensing component is provided so as to accommodate such purpose. This results in a simple structure for the light sensing component. In other words, with the light sensing component positioned opposite the common electrode the photosensor is liable to be influenced by the rectangular wave voltage of several volts that is normally applied to the common electrode, which would result in malfunction, but when active use is made of the common electrode voltage as in the present invention, this problem can be resolved without using a separate ground electrode or ground wire, etc. In addition, the voltage applied to the thin film transistor's gate electrode is a voltage to which there is always applied a particular reverse bias relative to the voltage applied to the common electrode. This means that the voltage applied to the gate electrode allows for the influence of the voltage applied to the common electrode, whether DC or AC. Hence, accurate light sensing can be performed even though the light sensing component is positioned opposite the common electrode.

In the first mode described above, the thin film transistor, capacitor and switch element may equally well be located in the interior of or exterior to the display panel. Locating such items exterior to the display panel will increase the degree of freedom for the location where the photosensor is installed. Alternatively, integrating such items on the display panel will render the light sensing component more compact and moreover will enable such items to be fabricated simultaneously with fabrication of the TFTs that serves as the active matrix substrate's substrate's switching elements, so that there will be no need for increased fabrication time and work in order to provide the light sensing component's capacitor and switch element. If the light sensing component's TFT is also integrated on the display panel together with the capacitor and switch element, the light sensing component can be rendered even more compact. In addition, since the leakage current occurring when reverse bias voltage is applied to the TFT's gate electrode is proportional to the intensity of the light, the intensity of the light can be sensed simply and with high sensitivity by measuring the capacitor's voltage a certain time after the switch element is switched off.

If the first mode described above is configured with the light sensing component's capacitor provided inside the display panel, while the light sensing component's switch element is provided exterior to the display panel as before, then such capacitor, being provided in the display panel, can be formed simultaneously with formation of the TFTs that serve as the active matrix substrate's switching elements, and there will be no need for increased fabrication time and work in order to provide the light sensing component's capacitor. If the TFT is integrated on the display panel together with the capacitor, the light sensing component can be rendered even more compact. Moreover, with the light sensing component's switch element provided exterior to the display panel, the degree of freedom for the installation where the switch element is installed will be increased. In addition, since the leaked current occurring when reverse bias voltage is applied to the TFT's gate electrode is proportional to the intensity of the light, the intensity of the light can be sensed simply and with high sensitivity by measuring the capacitor's voltage a certain time after the switch element is switched off.

If the first mode described above is equipped with a completely shielded photosensor and an unshielded photosensor for its photosensor, then the dark standard output will be stabilized by the output of the completely shielded photosensor, with the result that fluctuation in the photosensor's output will be small, as will variation in the photosensor's characteristics in the event of ambient temperature variation. Hence, it will be possible accurately to control the illuminating means to turn on and off automatically at a particular predetermined brightness.

If the first mode described above is configured so that the photosensor's thin film transistor is formed in the same fabrication process as the thin film transistors serving as the switching elements formed on the active matrix substrate, there will be no need for increased fabrication time and work in order to provide the photo sensor.

If the first mode described above is configured so that a voltage that varies in a rectangular form with a particular period, or more specifically, a voltage whose polarity is inverted with a particular period, is applied to the common electrode, then it will no longer be the case that DC component voltage is always generated in the space between the common electrode and the photosensor, and even with a liquid crystal layer formed in such space, there will be no danger of the liquid crystals deteriorating.

If the first mode described above is configured so that even though the common electrode voltage applied to the light sensing component is, for example, rectangular wave voltage with polarity inverted at a particular period, the voltage applied to the thin film transistor's gate electrode will be a rectangular wave voltage that is synchronous with the common electrode voltage and moreover has the same magnitude as the common electrode voltage, then it will be possible to turn off the thin film transistor's gate reliably during light sensing, and therefore the photosensor will be able to sense the light intensity with high sensitivity.

If the first mode described above is equipped with a control means having a threshold memorizer and a comparison component in the light sensing component, and in the regular mode, in which regular light sensing is performed, the comparison component is used to compare the output of the light sensing component against the threshold value stored in the threshold memorizer so as to implement on/off control of the illumining means, while in the initial setting mode, in which the threshold value to be stored in the threshold memorizer is set, light serving as a standard is shone at the photosensor and the resulting output of the photosensor is stored in the threshold memorizer, then any fluctuation that may occur in the photosensor's characteristics will be corrected via such shining of standard light during the initial setting mode, and hence it will be possible accurately to control the illuminating means to switch on and off automatically at a particular predetermined brightness. What is more, since the end user will be able to select the standard light as desired, the end user will be able to set the backlight, etc., to turn on and off automatically at any desired ambient brightness.

If in the first mode described above, the threshold memorizer and comparison component are provided inside the active matrix substrate's driver IC, there will be no special need to make the size of the active matrix substrate's periphery large in order to provide the threshold memorizer and/or comparison component, and as a result it will be possible to make smaller the size of the frame, which is held to be invalid for image displays.

According to the liquid crystal display device of the second mode of the present invention, the light sensing component is connected to the common electrode, and the first and second switch elements are controlled by applying to the common electrode a voltage that varies in a rectangular form with a particular period, for instance the common electrode voltage with polarity that differs with each fixed-length frame period. As a result, standard voltage is supplied so as to alternate, with each fixed-length frame period, between positive and negative relative to the common electrode voltage. Hence, AC component voltage will be applied to the liquid crystal layer of the liquid crystal display panel and it will no longer be the case that DC component voltage is always applied to such layer whenever the light sensing component is activated. Thanks to this, deterioration of the liquid crystals can be prevented. Further, for instance even though the common electrode voltage applied to the light sensing component is rectangular wave voltage of a particular magnitude, the fact that the voltage applied to the thin film transistor's gate electrode always has a particular reverse bias relative to the voltage applied to the common electrode means that the thin film transistor's gate can be reliably switched off when the light sensing component is activated, and thus the light intensity can be sensed with high sensitivity.

In the second mode described above, the thin film transistor, capacitor and switch elements may equally well be located in the interior of or exterior to the display panel. For example, locating such items on the exterior of the display panel will increase the degree of freedom for the location where the photosensor is installed. Alternatively, integrating such items on the display panel will render the light sensing component more compact and enable such items to be fabricated simultaneously with fabrication of the TFTs that serve as the active matrix substrate's switching elements, so that there will be no need for increased fabrication time and work in order to provide the light sensing component's capacitor and switch elements. If the light sensing component's TFTs are integrated on the display panel together with the capacitor and switch elements, the light sensing component can be rendered even more compact. In addition, since the leakage current occurring when reverse bias voltage is applied to the TFT's gate electrode is proportional to the intensity of the light, the intensity of the light can be sensed simply and with high sensitivity by measuring the capacitor's voltage a certain time after the switch elements are switched off.

If the second mode described above is configured with the light sensing component's capacitor provided inside the display panel, while the light sensing component's switch elements are provided exterior to the display panel as before, then such capacitor, being provided in the display panel, can be fabricated simultaneously with fabrication of the TFTs that serve as the active matrix substrate's switching elements, and there will be no need for increased fabrication time and work in order to provide the light sensing component's capacitor. If the TFT is integrated on the display panel together with the capacitor, the light sensing component can be rendered even more compact. Moreover, since the light sensing component's switch elements are provided exterior to the display panel, the degree of freedom for the locations where the switch elements are installed will be increased. In addition, since the leakage current occurring when reverse bias voltage is applied to the TFT's gate electrode is proportional to the intensity of the light, the intensity of the light can be sensed simply and with high sensitivity by measuring the capacitor's voltage a certain time after the switch elements are switched off.

If in the second mode described above, the switch elements are provided inside the driver IC, then the switch elements can easily be formed when the driver IC is fabricated and so there will be no need to form the switch elements separately.

If the second mode described above is equipped a completely shielded photosensor and an unshielded photosensor for its photosensor, then the dark standard output will be stabilized by the output of the completely shielded photosensor, with the result that fluctuation in the photosensor's output will be small, as will variation in the photosensor's characteristics in the event of ambient temperature variation. Hence, it will be possible accurately to control the illuminating means to switch on and off automatically at a particular predetermined brightness.

In the second mode described above, the thin film transistor serving as, the photosensor can be fabricated simultaneously with fabrication of the thin film transistors serving as the active matrix substrate's switching elements, so that there will be no need for increased fabrication time and work in order to provide the photosensor.

If the second mode described above is configured so that the fixed-length frame periods last for an integer multiple of the vertical scan period in the drive signal for the liquid crystal display panel, and the capacitor is charged by supplying to the light sensing component a particular standard voltage whose polarity is varied with such periods, then AC component voltage will be applied to the liquid crystal layer of the liquid crystal display panel when the light sensing component is activated and it will no longer be the case that DC component voltage is always applied to such layer. As a result, deterioration of the liquid crystals can be prevented and noise will be lessened.

If in the second mode described above, the standard voltage applied to the capacitor is made negative relative to the common electrode voltage when the common electrode voltage is high level, and is made positive relative to the common electrode voltage when the common electrode voltage is low level, then AC component voltage will be applied to the liquid crystal layer of the liquid crystal display panel when the light sensing component is activated and it will no longer be the case that DC component voltage is always applied to such layer. As a result, deterioration of the liquid crystals can be prevented.

If in the second mode described above, the standard voltage is made a voltage that is intermediate between the high level and low level voltages applied to the common electrode, it will be possible to produce the standard voltage with ease.

If the second mode described above is equipped with a control means having a threshold memorizer and a comparison component in the light sensing component, and in the regular mode, in which regular light sensing is performed, the comparison component is used to compare the output of the light sensing component against the threshold value stored in the threshold memorizer so as to implement on/off control of the illumining means, while in the initial setting mode, in which the threshold value to be stored in the threshold memorizer is set, light serving as a standard is shone at the photosensor and the resulting output of the photosensor is stored in the threshold memorizer, then any fluctuation that may occur in the photosensor's characteristics will be corrected via such shining of standard light during the initial setting mode, and hence it will be possible accurately to control the illuminating means to switch on and off automatically at a particular predetermined brightness. What is more, since the end user will be able to select the standard light as desired, the end user will be able to set the backlight, etc., to turn on and off automatically at any desired ambient brightness.

DESCRIPTION OF THE PREFERRED EMBODIMENTS

Preferred embodiments of the present invention will now be described with reference to the drawings. It should however be understood that the embodiments below represent merely illustrative instances of semi-transmissive liquid crystal display devices for realizing the technical thought of the present invention; these embodiments are not intended to limit the present invention to these particular liquid crystal display devices. The present invention can be embodied equally well in numerous other variants without departing from the technical thought set forth in the claims.

Figure 1:
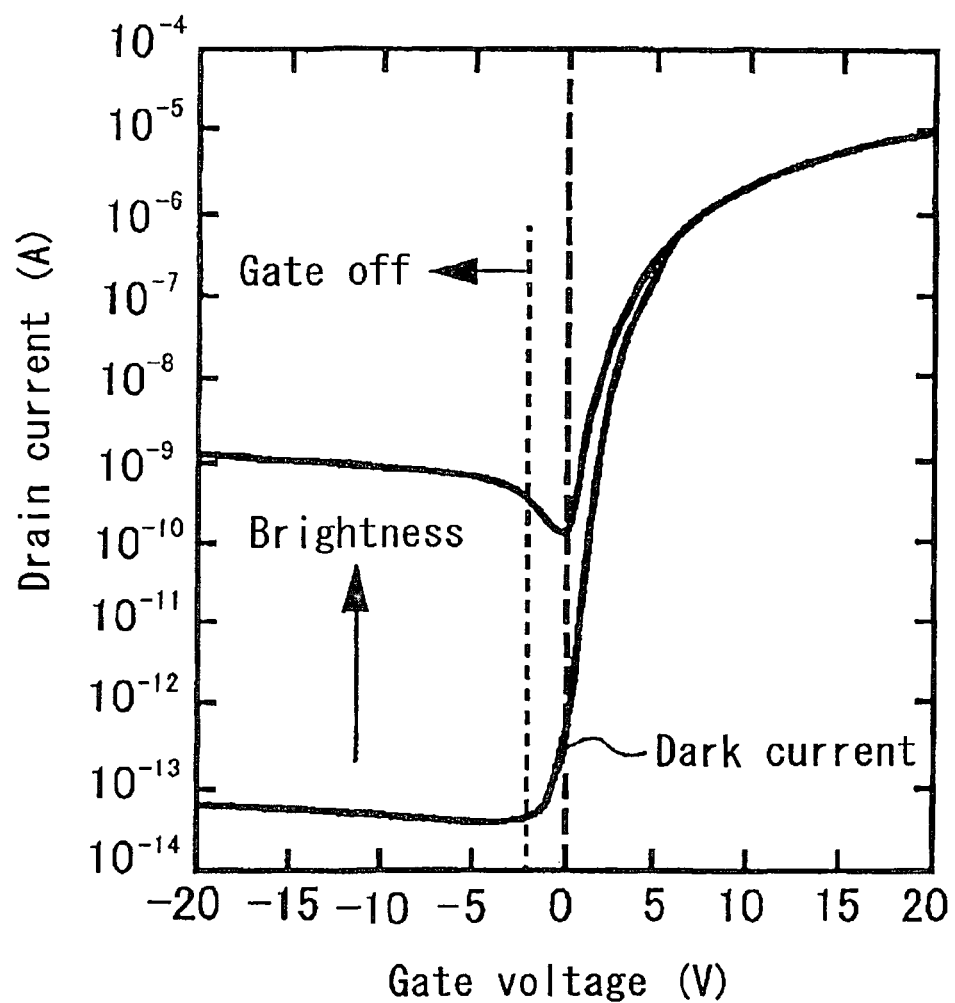
FIG. 1 is a graph showing sample voltage-current curves for a TFT photosensor.
Figure 2:
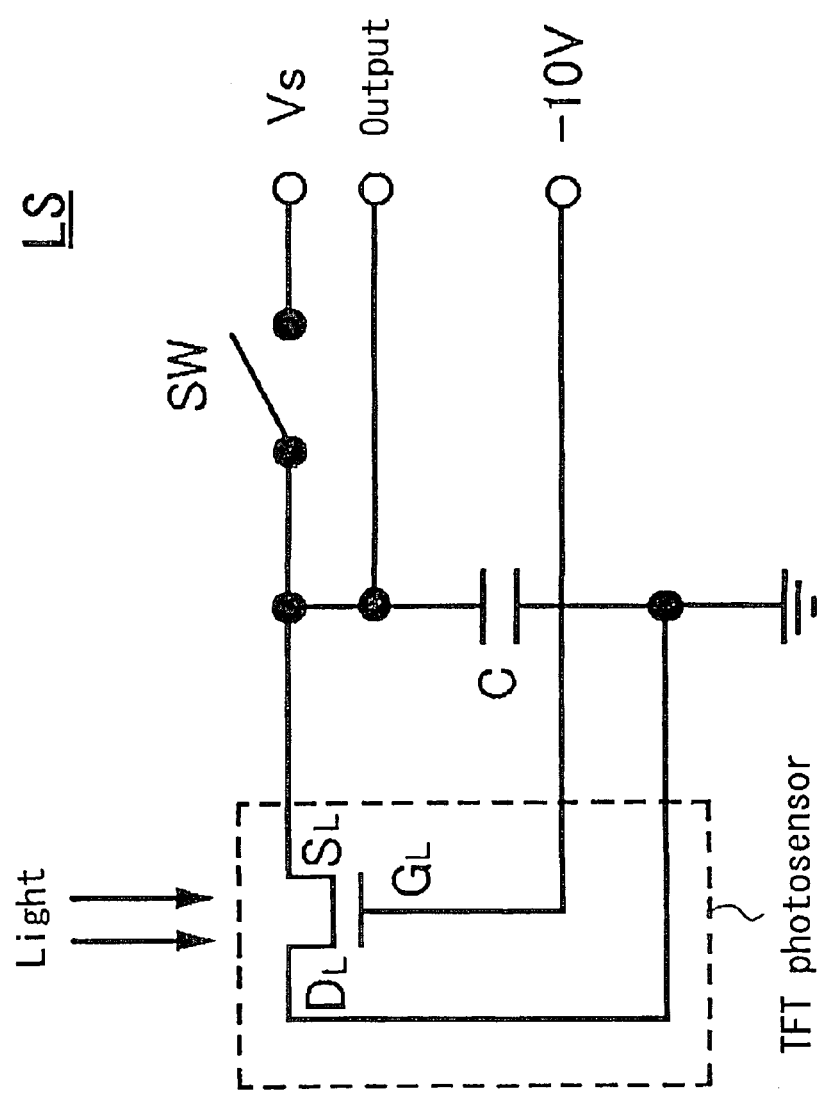
FIG. 2 is a circuit diagram for a light sensing component employing a TFT photosensor.
Figure 3:
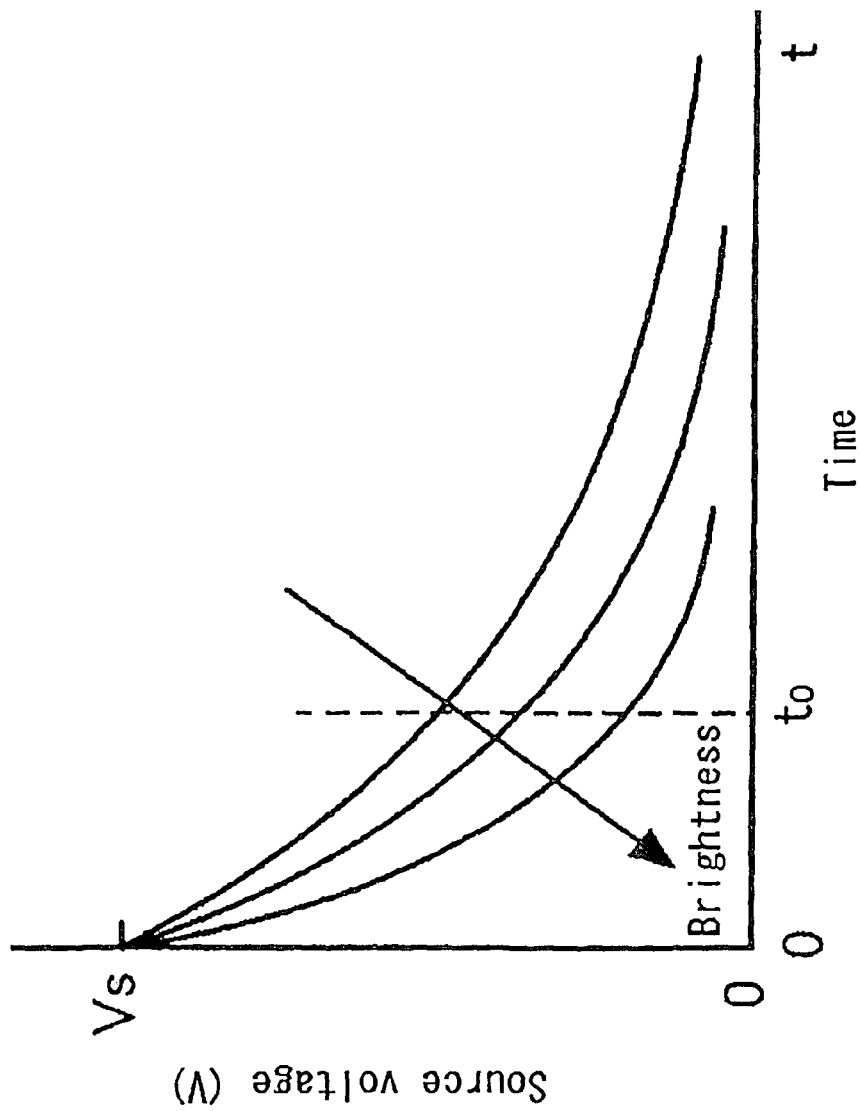
FIG. 3 is a graph showing voltage-time curves for the two capacitor terminals of the circuit diagram in FIG. 2 in the case where the brightness varies.

The commonly-known operating principles and drive circuits of the TFT serving as photosensor ("TFT photosensor" below) will be described first, using FIGS. 1 to 3. FIG. 1 is a graph showing sample voltage-current curves for a TFT photosensor, FIG. 2 is a circuit diagram for a light sensing component employing a TFT photosensor, and FIG. 3 is a graph showing voltage-time curves for the two capacitor terminals of the circuit diagram in FIG. 2 in the case where the brightness varies.

The TFT photosensor has a structure substantially identical to the TFTs that are used as switching elements for the active matrix type liquid crystal display panel. As is seen in the graph in FIG. 1, the TFT photosensor has the characteristic that when it is shielded, an extremely faint dark current flows in the gate-off region, whereas when light strikes the channel portion the leakage current grows large according to the intensity (brightness) of the light. This means that when, as shown in FIG. 2's circuit diagram of the light sensing component LS, a voltage with a particular reverse bias (for example −10V) that will produce a gate-off region is applied to the TFT photosensor's gate electrode $G_L$, a capacitor C is connected in parallel between the drain electrode $D_L$ and the source electrode $S_L$, and with the switch element SW turned on, a particular standard voltage Vs (for example +2V) is applied to the two terminals of the capacitor C, after which the switch element SW is turned off, the voltage at the two terminals of the capacitor C will fall with time according to the TFT photosensor's ambient brightness, as shown in FIG. 3. Hence, the TFT photosensor's ambient brightness can be determined by measuring the voltage of the two terminals of the capacitor C a certain time $t_0$ after the switch element SW is switched off, since a relation of inverse proportionality obtains between such voltage and such ambient brightness.

Embodiment 1

Figure 4:
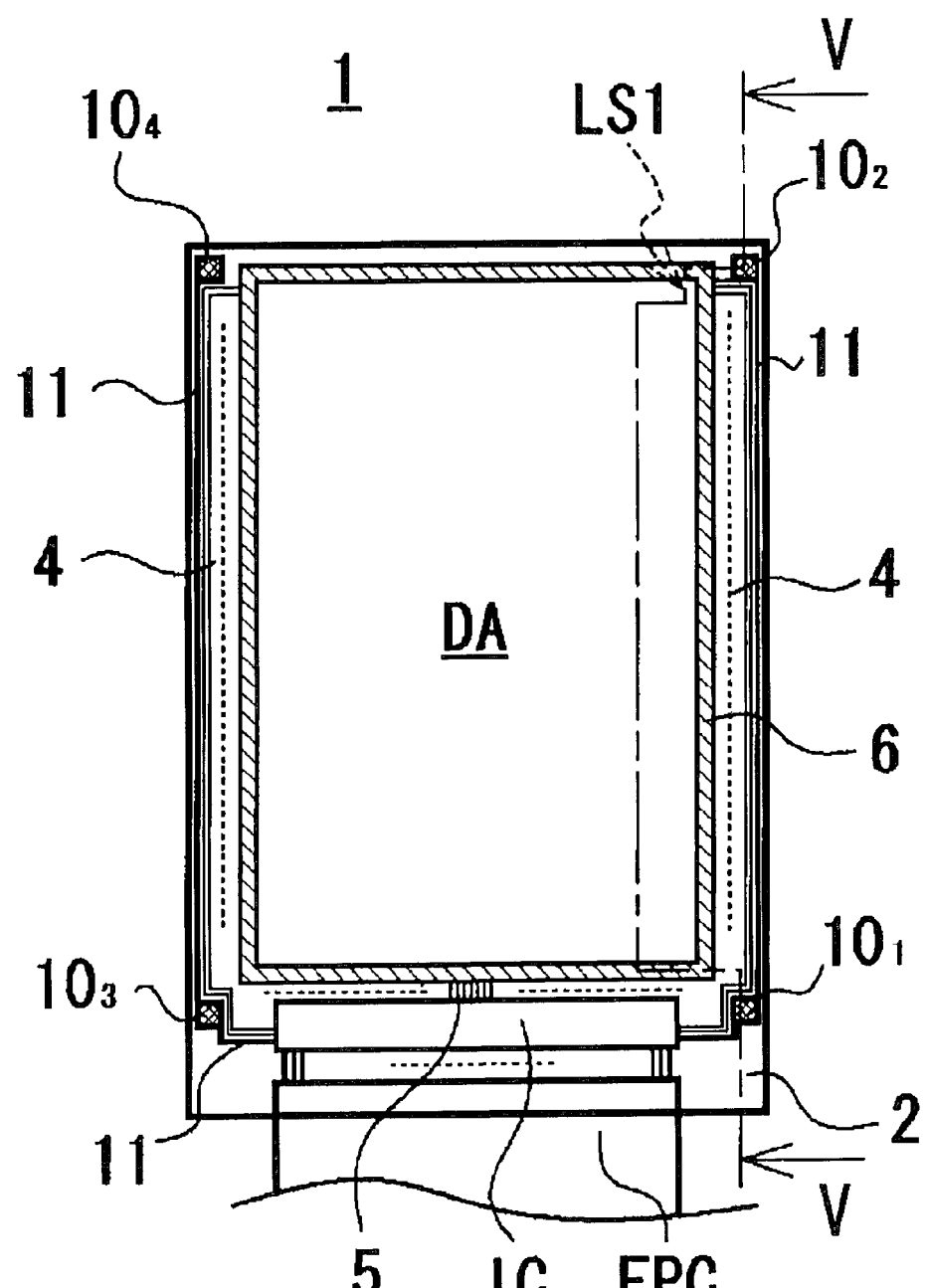
FIG. 4 is a planar view illustrating schematically the active matrix substrate seen through the color filter substrate in an embodiment of the liquid crystal display device of the present invention.

A semi-transmissive liquid crystal display device, incorporating a photosensor, of a first embodiment of the present invention will now be described with reference to FIGS. 4 and 5. FIG. 4 is a planar view illustrating schematically the active matrix substrate seen through the color filter substrate in the liquid crystal display device, while FIG. 5 is a cross-sectional view along line V-V in FIG. 4.

Figure 5:
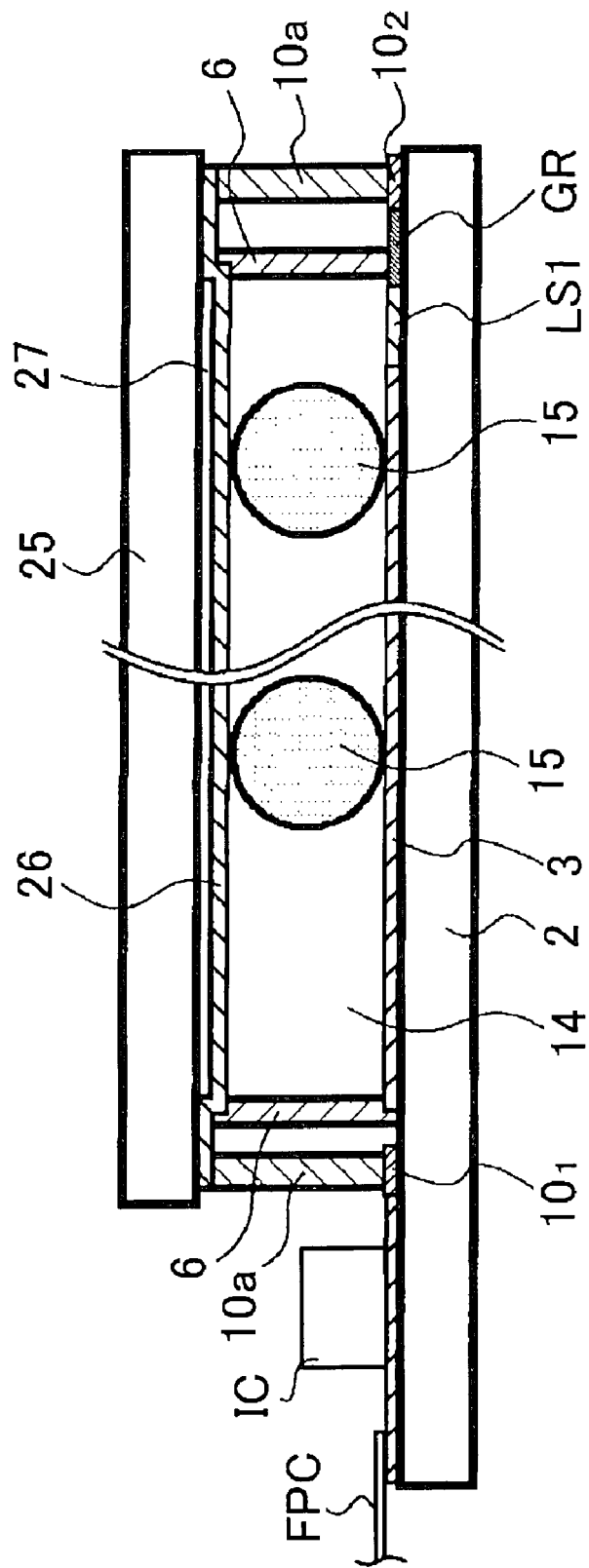
FIG. 5 is a cross-sectional view along line V-V in FIG. 4.

As shown in FIG. 5, a liquid crystal display device 1 has a structure whereby a liquid crystal layer 14 is formed between on the one hand an active matrix substrate ("TFT substrate" below) 2 which is composed of a transparent material with insulative properties, such as glass, and on whose surface a thin film transistor (TFT) or similar is mounted, and on the other hand a color filter substrate ("CF substrate" below) 25 on whose surface color filters or similar are formed.

In the display area DA of the TFT substrate 2, gate wires 4 and source wires 5 are formed in a matrix layout. In the spaces enclosed by the gate wires 4 and source wires 5 there are formed pixel electrodes 12, and at the places where the gate wires 4 and source wires 5 cross over there are formed TFTs that serve as switching elements and are connected to the pixel electrodes 12 (see FIG. 7). As will be described later, a light sensing component LS1 is provided in a location close to the periphery of the display area DA, or more specifically, close to the portion of the display area DA where seal material 6 is applied.

Figure 6:
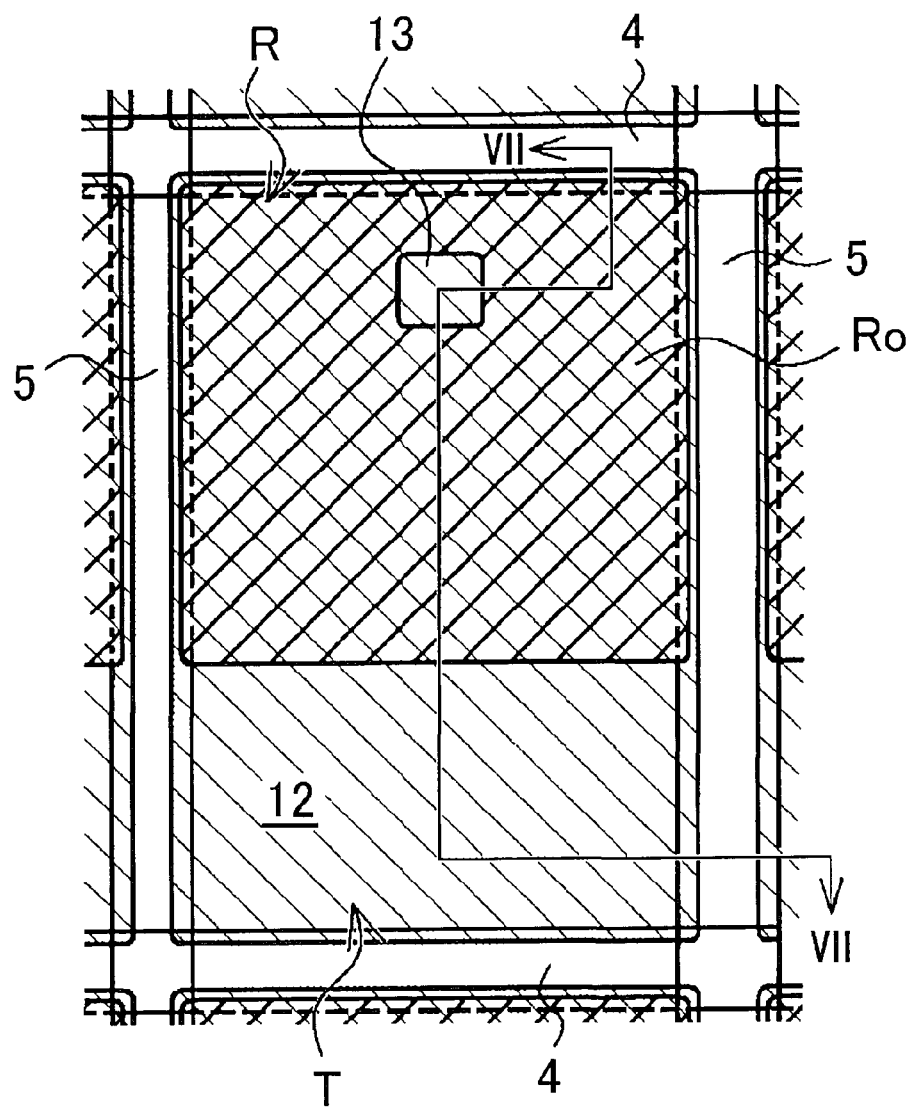
FIG. 6 is a planar view of a single pixel seen through the color filter substrate of the liquid crystal display device.
Figure 7:
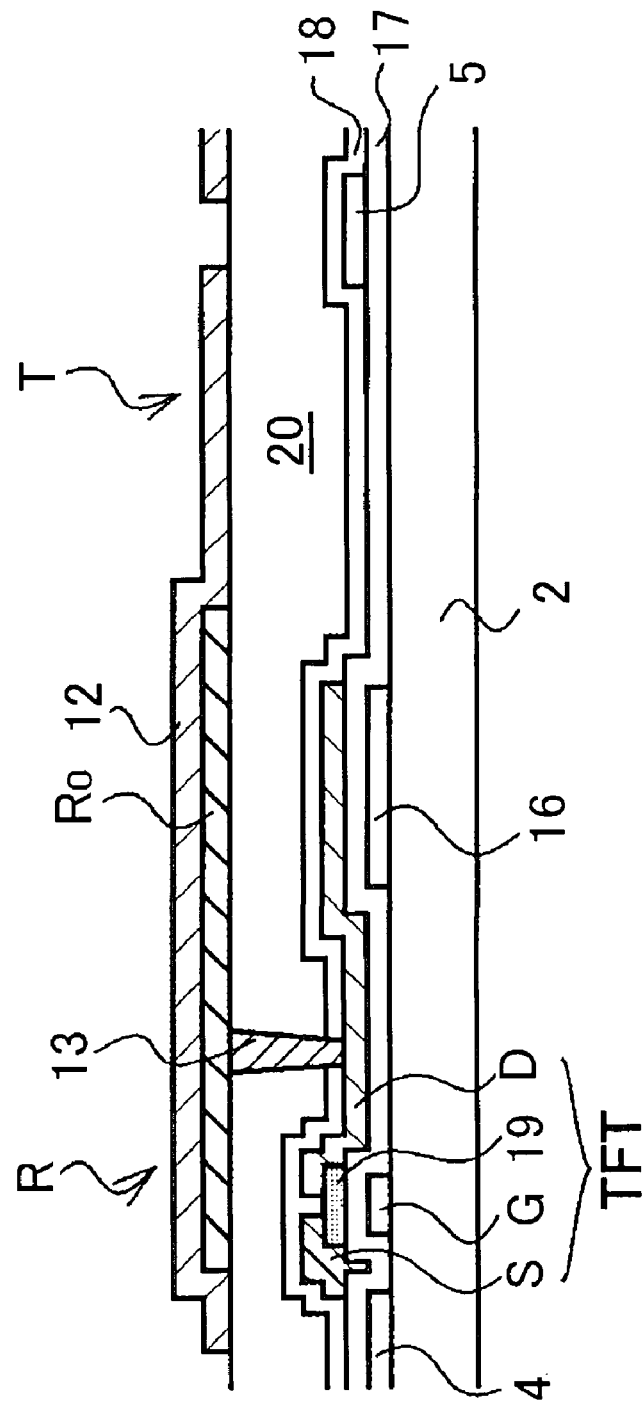
FIG. 7 is a cross-sectional view on VII-VII in FIG. 6 that includes the color filter substrate.
Figure 8:
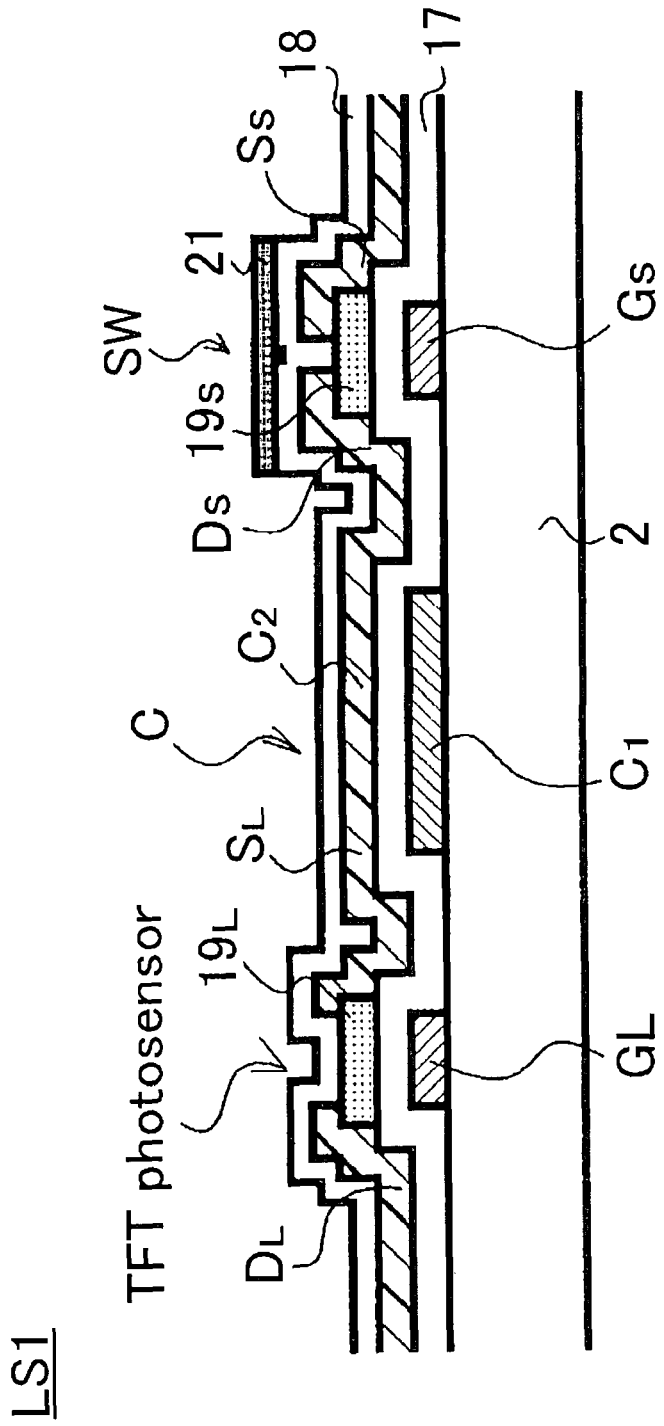
FIG. 8 is a cross-sectional view of the light sensing component on the substrate.

Such wires, TFTs and pixel electrodes are shown schematically as a first structure 3 in FIG. 5; the concrete configurations are shown in FIGS. 6 to 8 and will be described later.

As shown in FIG. 4, at one of the short sides of the TFT substrate 2 there is provided a flexible printed circuit FPC for connection to an image provision device (not shown in the drawings) for driving the liquid crystal display device 1. The flexible printed circuit FPC connects a data wire and control wire from the image provision device to a driver IC. A VCOM signal, source signal and gate signal are generated inside the driver IC and are connected respectively to a common wire 11, the source wires 5 and the gate wires 4 on the TFT substrate 2.

A plurality of transfer electrodes $10_1$-$10_4$ is provided in the four corners of the TFT substrate 2. These transfer electrodes $10_1$-$10_4$ are connected to each other, either directly via the common wire 11 or else inside the driver IC, in such a manner as to have the same potential. Each of the transfer electrodes $10_1$-$10_4$ is electrically connected to a common electrode 26 to be described later, so that the common electrode voltage that is output from the driver IC will be applied to the common electrode 26.

The CF substrate 25 is a glass substrate on the surface of which are formed color filters of a plurality of colors such as red (R), green (G) and blue (B), plus a black matrix. The CF substrate 25 is deployed opposing the TFT substrate 2, and the black matrix is deployed at least in positions corresponding to the gate wires 4 and source wires 5 of the TFT substrate 2, with the color filters being provided in the spaces partitioned by the black matrix. Although the specific structure of the color filters, etc., is not shown in the drawings, such items are represented schematically as a second structure 27 in FIG. 5. Also provided on the CF substrate 25 is a common electrode 26 that is composed of transparent electrodes constituted of indium oxide, tin oxide or similar. This common electrode 26 extends for a distance such that it fully opposes the light sensing component LS1 formed on the TFT substrate 2 (see FIG. 5).

The seal material 6 is applied all around the periphery of the display area DA of the TFT substrate 2, except for a filling inlet (not shown in the drawings). The seal material 6 is a thermosetting resin such as epoxy resin, with a filler of insulative bodies added. The contact material 10a that connects the two substrates is composed of, for example, conductive particles and thermosetting resin, with a metallic coating applied on the surface.

In order to stick the two substrates 2, 25 together the following procedure is implemented. First, the TFT substrate 2 is installed in a first dispenser device and the seal material 6 is applied in a particular pattern. Next, the TFT substrate 2 is installed in a second dispenser device and the contact material 10a is applied onto the transfer electrodes $10_1$-$10_4$. Following that, spacers 15 are spread evenly over the display area DA of the TFT substrate 2, and adhesive for provisional fixing is applied to the portions with which the seal material 6 of the CF substrate 25 and the contact material 10a will contact. After that, the TFT substrate 2 and the CF substrate 25 are stuck together, the adhesive for provisional fixing is allowed to set, and provisional fixing is thereby complete. Then the provisionally fixed two substrates 2, 25 are subjected to heating treatment while being pressed together, whereupon the thermosetting resin of the seal material 6 and the contact material 10a hardens, creating an empty liquid crystal display panel. The interior of such empty liquid crystal display panel is then filled with liquid crystals via a filling inlet not shown in the drawings. To complete the liquid crystal display device 1, the filling inlet is then blocked up with sealant. On the lower surface of the TFT substrate 2 there is deployed a backlight or sidelight that is not shown in the drawings and that has a light source, light guide plate and diffusion sheet of commonly known types.

The pixel structure of such liquid crystal display device will now be described with the aid of FIGS. 6 and 7. FIG. 6 is a planar view of a single pixel seen through the CF substrate of the liquid crystal display device, while FIG. 7 is a cross-sectional view on VII-VII in FIG. 6 that includes the CF substrate.

On the display area DA of the TFT substrate 2 there are formed in parallel multiple gate wires 4 constituted of a metal such as aluminum or molybdenum spaced equally apart. Roughly centrally between adjacent pairs of gate wires 4 there are formed, simultaneously with the gate wires 4 and in parallel, auxiliary capacity wires 16. Also, gate electrodes G for the TFTs extend from the gate wires 4. Further, a gate insulating film 17 constituted of silicon nitride, silicon oxide or similar is laid over the TFT substrate 2 so as to cover the gate wires 4, auxiliary capacity wires 16 and gate electrodes G. A semiconductor layer 19 constituted of amorphous silicon, polycrystalline silicon or similar is formed over the gate electrodes G with the gate insulating film 17 interposed, and multiple source wires 5 constituted of a metal such as aluminum or molybdenum are formed over the gate insulating film 17 so as to be orthogonal to the gate wires 4. Source electrodes S for the TFTs extend from the source wires 5. These source electrodes S contact with the semiconductor layer 19. Moreover, drain electrodes D of the same material as and formed simultaneously with the source wires 5 and the source electrodes S, are provided over the gate insulating film 17. These drain electrodes D also contact with the semiconductor layer 19.

Each of the areas enclosed by the gate wires 4 and source wires 5 corresponds to 1 pixel. TFTs serving as switching elements are configured by means of the gate electrodes G, gate insulating film 17, semiconductor layer 19, source electrodes S and drain electrodes D, one such TFT being formed in each pixel. Auxiliary capacity for each pixel is formed by the drain electrodes D and the auxiliary capacity wires 16.

A protective insulating layer 18 constituted of, for example, inorganic insulative material is laid so as to cover the source wires 5, TFTs, and gate insulating film 17, and over the protective insulating layer 18 there is laid an interlayer film 20 constituted of organic insulating film. Minute concavo-convexities are formed on the reflective portion R of the interlayer film 20's surface, while the transmissive portion T is even. The concavo-convexities of the interlayer film 20 at the reflective portion R are omitted in FIG. 7. A connecting hole 13 is formed in the protective insulating layer 18 and interlayer film 20, in a position that corresponds to the TFT drain electrode D. Further, in each pixel a reflective electrode $R_0$ constituted of, for example, aluminum metal is provided over the top of the connecting hole 13 and part of the interlayer film 20's surface at the reflective portion R. Over the surface of the reflective electrode $R_0$ and the interlayer film 20's surface at the transmissive portion T there is formed a pixel electrode 12 constituted of, for example, ITO.

Figure 9A:
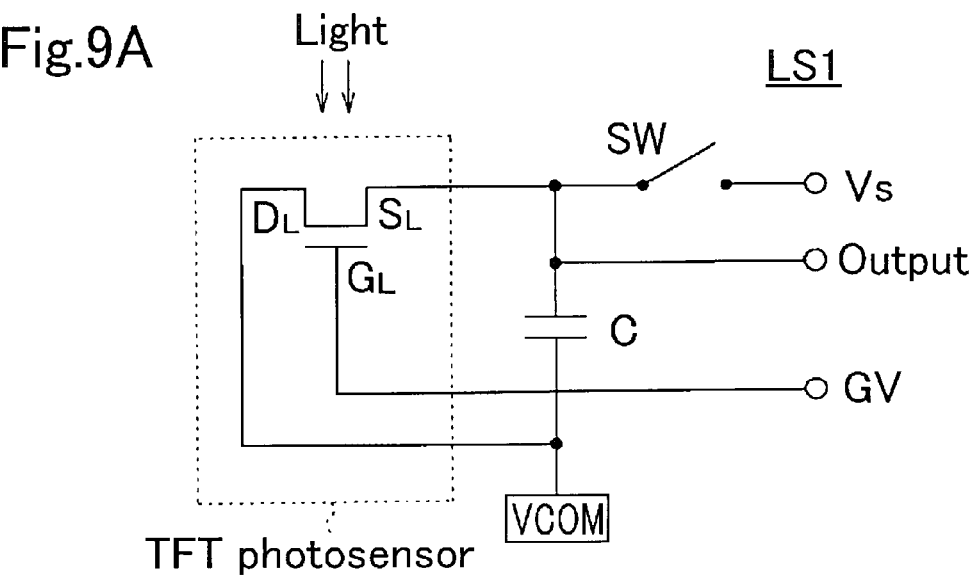
FIG. 9A is a diagram illustrating the equivalent circuits for the light sensing component.
Figure 9B:
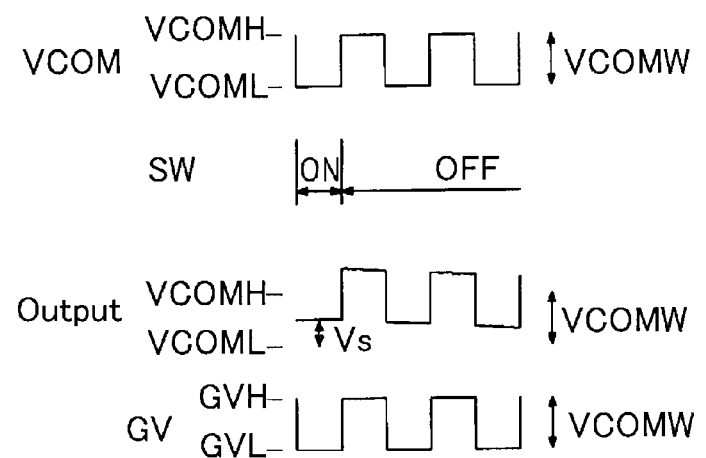
FIG. 9B is a timing chart illustrating the output waveforms of the various components during driving of the photosensor.

The structure and operation of the light sensing component will now be described using FIGS. 8 and 9. FIG. 8 is a cross-sectional view of the light sensing component on the substrate. FIG. 9A is a diagram illustrating the equivalent circuits for the light sensing component, and FIG. 9B is a timing chart illustrating the output waveforms of the various components during driving of the photosensor.

The circuit configuration of the light sensing component LS1 is almost the same as that of light sensing component LS in FIG. 2, differing only in that the ground terminal GR connected to the capacitor C connected between the drain electrode $D_L$ and source electrode $S_L$ is connected to the common electrode ("VCOM" in FIG. 9) 26 via transfer electrode $10_2$ (see FIG. 5). The TFT photosensor and switch element SW of the light sensing component LS1 are formed simultaneously with the TFTs serving as switching elements that are provided inside the display area DA of the TFT substrate 2.

As FIGS. 8 and 9A show, the light sensing component LS1 is composed of a TFT photosensor, a capacitor C, and a switch element SW constituted of TFTs. On the surface of the TFT substrate 2 there are formed, given in order from the lower end upward: a gate electrode $G_L$ for the TFT photosensor, an electrode $C_1$ that is one of the capacitor C's electrodes, and a gate electrode $G_S$ for the TFTs constituting the switch element SW. Over the surfaces of these items there is laid a gate insulating film 17 constituted of silicon nitride, silicon oxide or similar.

Over the TFT photosensor's gate electrode $G_L$ and over the gate electrode $G_S$ for the TFTs constituting the switch element SW, there are formed respectively, with the gate insulating film 17 interposed, semiconductor layers $19_L$ and $19_S$ constituted of amorphous silicon, polycrystalline silicon or similar. Further, a source electrode $S_L$ plus drain electrode $D_L$, constituted of a metal such as aluminum or molybdenum, for the TFT photosensor, and a source electrode $S_S$ plus drain electrode $D_S$ for the TFTs constituting the switch element SW, are provided over the gate insulating film 17 so as to contact respectively the semiconductor layers $19_L$ and $19_S$. Two of these electrodes, the source electrode $S_L$ for the TFT photosensor and the drain electrode $D_S$ for the TFTs constituting the switch element SW, are extended toward and connected to each other, thereby forming the capacitor C's other electrode $C_2$. Moreover, a protective insulating layer 18 constituted of, for example, inorganic insulative material is laid so as to cover the surfaces of the TFT photosensor, the capacitor C, and the switch element SW constituted of TFTs. In addition, the surface of the switch element SW constituted of TFTs is sheathed over with a black matrix 21 so as not to be affected by exterior light.

Over the CF substrate 25 which is positioned opposite the light sensing component LS1 of the TFT substrate 2, there is formed a common electrode 26 which extends for a distance such that it fully opposes the light sensing component LS1. The drain electrode $D_L$ for the TFT photosensor that is a component of the light sensing component LS1 is connected to this common electrode 26 via a ground terminal GR, transfer electrode $10_2$ and connecting material $10a$ (see FIG. 5).

The drive operation of the light sensing component LS1 will now be described.

As shown in FIG. 9B, a common electrode voltage ("VCOM" below) of a particular magnitude is applied to the common electrode 26. VCOM forms rectangular waves; in FIG. 9B the high level of VCOM is labeled VCOMH and the low level VCOML. This VCOM is also applied to the TFT photosensor and the capacitor C. A particular negative voltage GV synchronous with VCOM is applied to the gate electrode $G_L$ for the TFT photosensor. GV has magnitude identical to VCOM's and a voltage level that is always set lower than VCOM's by a particular reverse bias voltage amounting for example to 10V. Thus GVH, the high level of GV, will be set to VCOMH−10V and the low level GVL will be set to VCOML−10V.

Under such conditions, when VCOM is at low level the switch element SW will be closed and a standard voltage Vs will be applied to charge the capacitor C, whereupon GVL will be applied to the gate electrode $G_L$. As a result the capacitor C charging voltage will fall due to leakage current produced by the shining of light onto the TFT photosensor, and the output voltage waveform shown in FIG. 9B will be obtained. By detecting such voltage it is then possible to determine the external light. Although in the foregoing description of embodiment 1 the capacitor C is charged with standard voltage by closing the switch element SW for the duration of VCOML, alternatively the VCOMH duration could be utilized for such charging.

Figure 10:
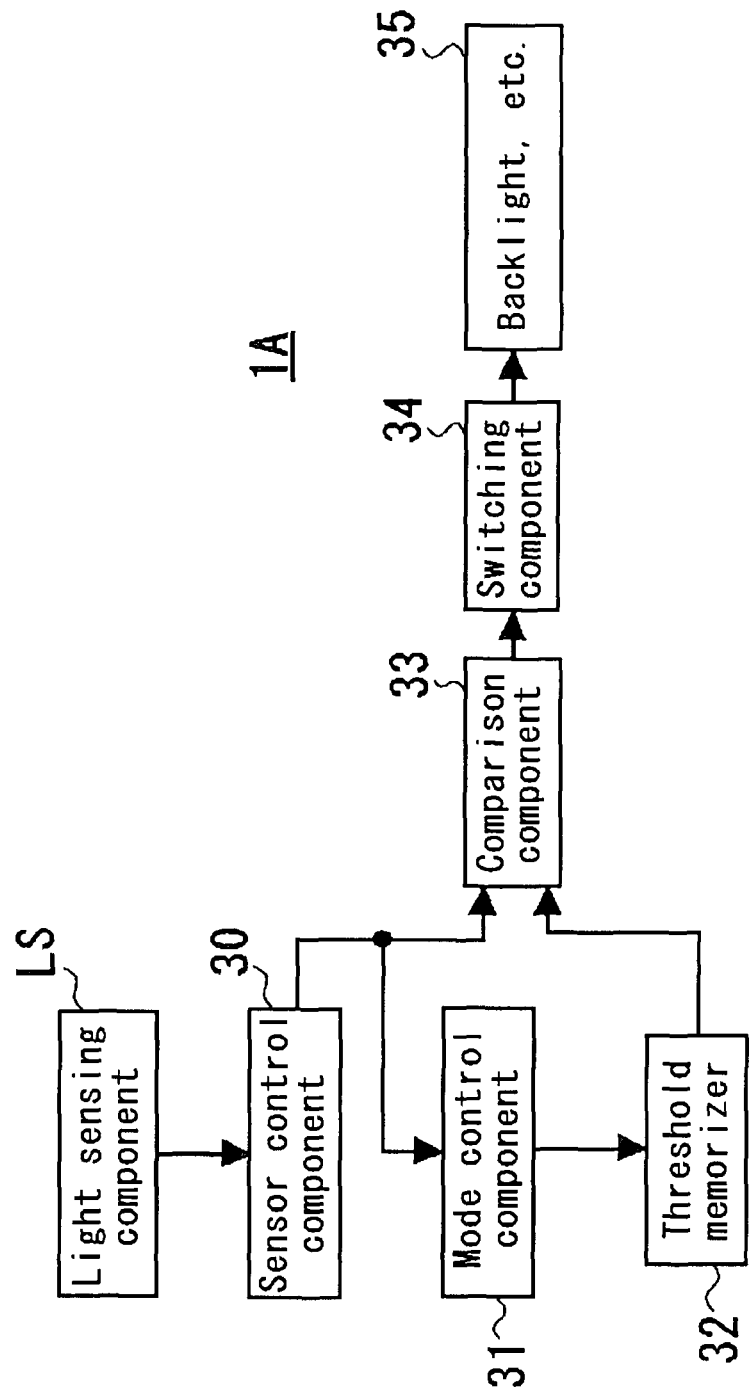
FIG. 10 is a block diagram of the backlight control means.

Further, the output of the light sensing component LS1 is input to a backlight control means 1A, where it is used for on/off control of the illuminating means. FIG. 10 is a block diagram illustrating the configuration of such control means.

The output of the light sensing component LS1 undergoes processing by a sensor control component 30, then is input to one terminal of the comparison component 33, and additionally is input to a mode control component 31. The mode control component 31 switches between the regular operation mode and initial setting mode according to input signals from the exterior, and is configured so as to cause the output of the sensor control component 30 to be input to and memorized by a threshold memorizer 32 in the initial setting mode, and to cause the output of the sensor control component 30 to be shut off in the regular operation mode. Further, the threshold memorizer 32 is configured so as to output the memorized threshold value to the other terminal of the comparison component 33.

In the regular operation mode the comparison component 33 compares the input signal from the sensor control component 30 and the input signal from the threshold memorizer 32, and is configured so as to cause the backlight, etc. 35 to be turned down via a switching component 34 if the input signal from the sensor control component 30 is greater (darker) than the threshold value memorized in the threshold memorizer 32, and to cause the backlight, etc. 35 to be turned up via the switching component 34 if on the contrary the input signal from the sensor control component 30 is smaller (brighter) than the threshold value memorized in the threshold memorizer 32.

When the initial setting mode has been selected, the mode control component 31 sends the output from the sensor control component 30 to be memorized in the threshold memorizer 32, and so by shining light of a predetermined brightness onto the TFT photosensor it will be possible to have a threshold value corresponding to the brightness of such light memorized. Hence, the backlight, etc., can be accurately controlled to turn on and off using a predetermined brightness as boundary, even if there is fluctuation in the TFT photosensor's light-electricity characteristics.

The predetermined brightness may be set as a single fixed value in the manufacturing process, or alternatively it may be made possible to change it so that the end user can have on/off control of the backlight, etc., implemented automatically according to any appropriate brightness desired. To ensure that the backlight, etc., is not controlled to turn on and off too frequently, the comparison component 33 may be given characteristics such that the brightnesses at which the backlight, etc., is turned on and turned off are varied, that is, hysteresis characteristics. Such hysteresis characteristics could be achieved in a simple manner by equipping the comparison component 33 with a hysteresis comparator.

The embodiment is not limited to using a single TFT photosensor; multiple TFT photosensors could be used. More precisely, multiple TFT photosensors could be accommodated by averaging their output. In the case of a pair, one TFT photosensor could be completely shielded and used to produce a dark standard value, and the difference between that value and the output of the other, unshaded TFT photosensor could be used to enhance the precision of brightness determination.

Embodiment 2

Although in the foregoing embodiment 1 the standard voltage $V_S$ charged into the capacitor C was voltage of a specific level, it is possible to vary such voltage with the frame periods. Accordingly, embodiment 2 of the present invention which will now be described is a liquid crystal display device 1' in which two standard voltages are provided for charging of the capacitor C. The basic structure of the liquid crystal display device 1' of embodiment 2 is the same as that shown in FIGS. 1 to 8 and FIG. 10 for embodiment 1, and differs from embodiment 1 only in the circuit configuration and the operating states of the light sensing component entailed by such circuit configuration, shown in FIG. 9. Below therefore, items that are structurally similar to those in embodiment 1 are referred to with the identical reference numerals and the foregoing descriptions concerning them are to be understood; the following description deals only with the structural differences from embodiment 1.

Figure 11A:
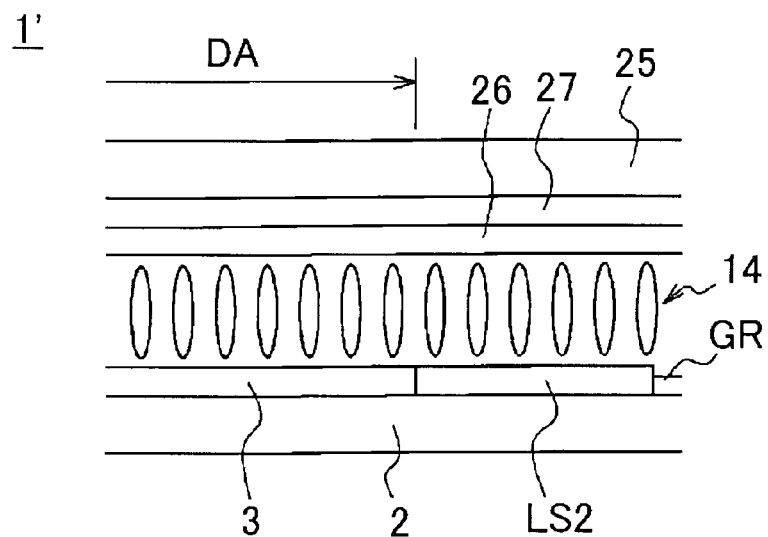
FIG. 11 illustrates the liquid crystal display device of a second embodiment, FIG. 11A being a cross-sectional view of the main elements of the light sensing component and FIG. 11B an equivalent circuit diagram for the light sensing component.
Figure 11B:
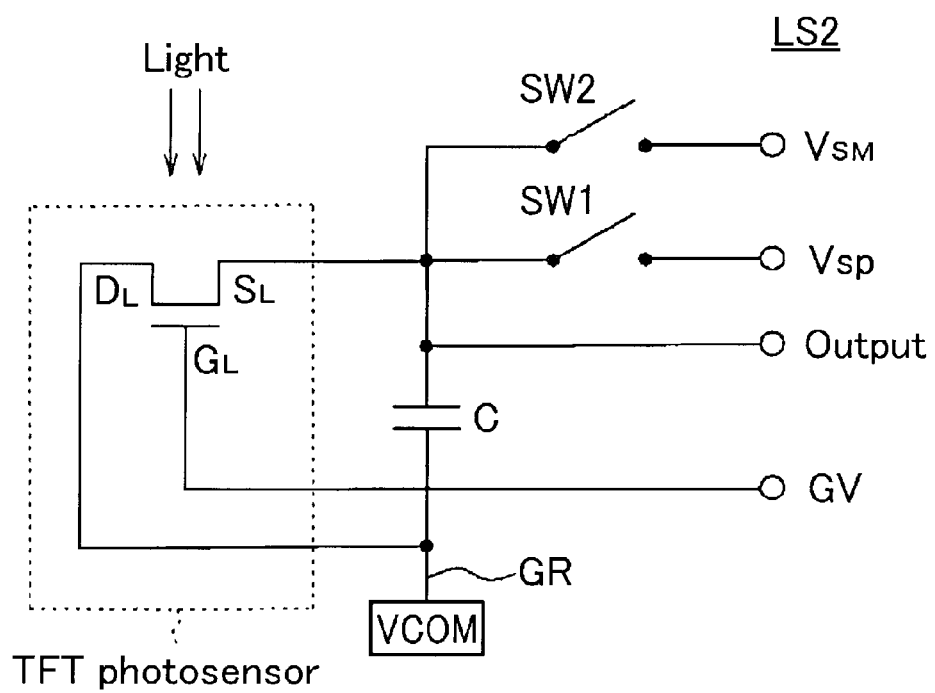
Figure 12:
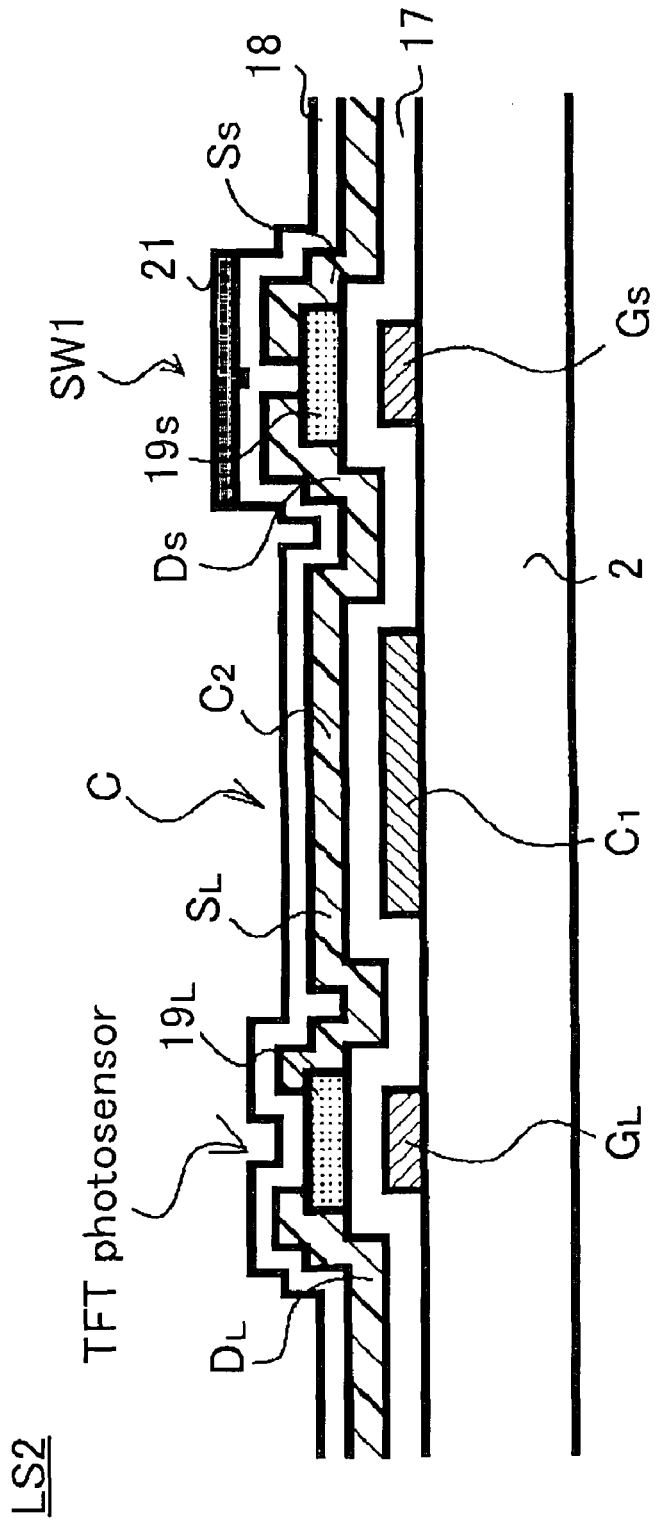
FIG. 12 is a cross-sectional view illustrating the photosensor and a switch element on the TFT substrate.
Figure 13:
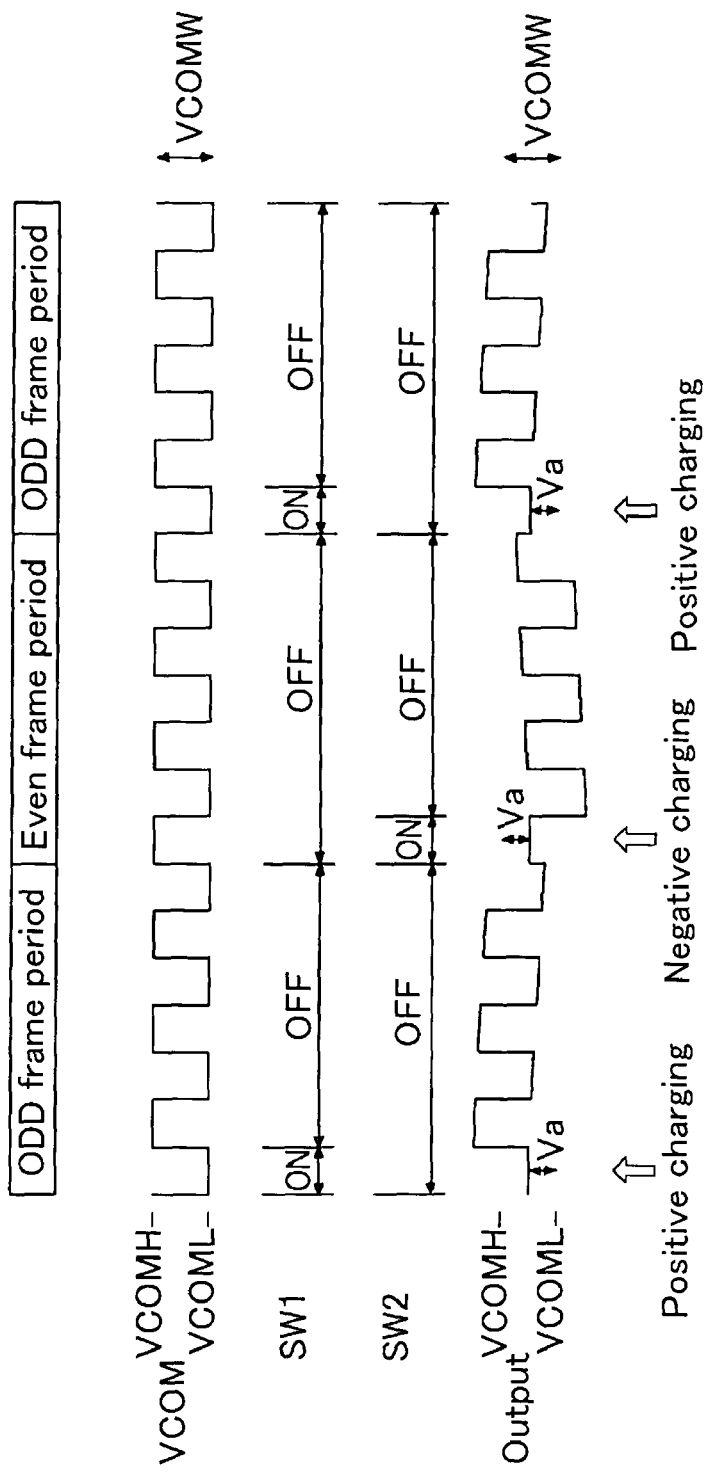
FIG. 13 is a timing chart illustrating the output waveforms of the various components during driving of the photosensor of the light sensing component shown as in FIG. 11, together with the activation timing of the switch elements.

FIG. 11 illustrates the liquid crystal display device of a second embodiment of the present invention, FIG. 11A being a cross-sectional view of the main elements of the light sensing component and FIG. 11B an equivalent circuit diagram for the light sensing component; FIG. 12 is a cross-sectional view illustrating the photosensor and a switch element on the TFT substrate; and FIG. 13 is a timing chart illustrating the output waveforms of the various components during driving of the photosensor of the light sensing component shown in FIG. 11, together with the activation timing of the switch elements.

As FIG. 11A shows, the light sensing component LS2 of the liquid crystal display device 1' of embodiment 2 is provided at the outer periphery of the display area DA—more precisely, on the inner edge of the area where the seal material 6 is applied—and contacts with the liquid crystal layer 14. The light sensing component LS2 has a circuit configuration such that, as shown in FIG. 11B, a capacitor C is connected in parallel between the TFT photosensor's drain electrode $D_L$ and source electrode $S_L$, the source electrode $S_L$ and one terminal of the capacitor C are connected via first and second switch elements SW1, SW2 to first and second standard voltage sources $V_{SP}$, $V_{SM}$, and the capacitor C's other terminal, which is connected to the drain electrode $D_L$ and corresponds to the ground terminal GR, is connected via transfer electrode $10_2$ to the common electrode 26.

The TFT photosensor and switch elements SW1, SW2 are all constituted of TFTs and formed on the TFT substrate 2. More precisely as shown in FIG. 12, the gate electrode $G_L$ for the TFT photosensor, one terminal $C_1$ of the capacitor C, and a gate electrode $G_S$ for the TFTs constituting one switch element SW1 are formed on the TFT substrate 2, and covering the surfaces of these items there is laid a gate insulating film 17 constituted of silicon nitride, silicon oxide or similar. Over the TFT photosensor's gate electrode $G_L$ and over the gate electrode $G_S$ for the TFTs constituting switch element SW1, there are formed respectively, with the gate insulating film 17 interposed, semiconductor layers $19_L$ and $19_S$ constituted of amorphous silicon, polycrystalline silicon or similar. Further, a source electrode $S_L$ plus drain electrode $D_L$, constituted of a metal such as aluminum or molybdenum, for the TFT photosensor, and a source electrode $S_S$ plus drain electrode $D_S$ for the TFTs constituting switch element SW1, are provided over the gate insulating film 17 so as to contact respectively the semiconductor layers $19_L$ and $19_S$. Two of these electrodes, the source electrode $S_L$ for the TFT photosensor and the drain electrode $D_S$ for the TFTs constituting switch element SW1, are extended toward and connected to each other, thereby forming the other terminal $C_2$ of the capacitor C. Moreover, a protective insulating layer 18 constituted of, for example, inorganic insulative material is laid so as to cover the surfaces of the TFT photosensor, the capacitor C, and the switch element SW1 constituted of TFTs. In addition, the surface of the switch element SW1 constituted of TFTs is sheathed over with a black matrix 21 so as not to be affected by external light.

Switch element SW2 is formed on the TFT substrate 2 using the same methods, and is omitted in FIG. 12. Over the CF substrate 25 located opposite the light sensing component LS2, a common electrode 26 extends for a distance such that it fully opposes the light sensing component LS2, as shown in FIG. 11A. The drain electrode $D_L$ for the TFT photosensor that is a component of the light sensing component LS2, and the capacitor C's other terminal $C_2$, are connected to this common electrode 26 via the ground terminal GR and transfer electrode $10_2$.

The operation of the light sensing component LS2 will now be described.

As FIG. 13 shows, a common electrode voltage of a particular magnitude ("VCOM" below) is applied to the liquid crystal display panel's common electrode. More specifically, VCOM is a rectangular wave voltage, whose swing will be referred to as VCOMW, voltage at high level as VCOMH, and voltage at low level as VCOML. VCOM is simultaneously applied to the TFT photosensor's drain electrode $D_L$ and to the capacitor C's terminal $C_2$. A particular negative voltage GV synchronous with VCOM is applied to the gate electrode $G_L$ of the TFT photosensor. GV has magnitude identical to that of VCOM, and a voltage level that is always set lower than VCOM's by a particular reverse bias voltage amounting for example to 10V. Thus GVH, the high level of GV, will be set to VCOMH−10V and the low level GVL will be set to VCOML−10V.

Under such conditions, standard voltage that varies with each fixed-length frame period, for example, that varies alternately with odd-numbered (ODD) and even-numbered (EVEN) frame periods, is applied to the light sensing component LS2. For instance, in each VCOML period during an ODD frame period, the first switch element SW1 will be turned on (with switch element SW2 being off), so that voltage from the first standard voltage source $V_{SP}$, which supplies the standard voltage VCOML+Va, will be applied to and charge the capacitor C. Through such charging, the capacitor C will be positively charged with the positive standard voltage Va. Afterward, the first switch element SW1 will be turned into the off state, whereupon voltage GV, for turning off the gate, will be applied to the TFT photosensor's gate electrode $G_L$. As a result leakage current will flow due to incidence of light on the TFT photosensor—although otherwise no current would flow—and therefore the potential difference between the capacitor C's two terminals will slowly fall, and the output voltage waveform shown for the ODD frame period in FIG. 13 will be obtained.

On the other hand, in each VCOMH period during an EVEN frame period the second switch element SW2 will be turned on (with switch element SW1 being off), with the result that voltage from the second standard voltage source $V_{SM}$, which supplies the standard voltage VCOMH−Va, will be applied to and charge the capacitor C. Through such charging, the capacitor C will be negatively charged with the negative standard voltage −Va. Afterward, the second switch element SW2 will be turned into the off state, whereupon voltage GV, for turning off the gate, will be applied to the TFT photosensor's gate electrode $G_L$. As a result leakage current will flow due to incidence of light on the TFT photosensor—although otherwise no current would flow—and therefore the potential difference between the capacitor C's two terminals will slowly fall, so that the output voltage waveform shown for the EVEN frame period in FIG. 13 will be obtained.

Thus, with each alternation between ODD and EVEN frame periods, standard voltage of a different polarity, VCOML+Va or VCOMH−Va, will be applied to the light sensing component LS2. Thanks to this, AC component sensing output will be obtained from the light sensing component LS2. What is more, when the light sensing component LS2 is activated, AC drive will be implemented for the common electrode 26. Hence, at such times DC voltage will not be applied to the liquid crystal layer 14 between the light sensing component LS2 and the common electrode 26. This can prevent deterioration of the liquid crystals.

Further, the fixed-length frame period is set to be an integer multiple of the vertical scan period in the drive signal for the liquid crystal display panel, and switching between activation of the first and second switch elements SW1 and SW2 coincides with such frame periods, so that standard voltage of varying polarity, VCOML+Va or VCOMH−Va, is supplied to the light sensing component LS2 and charges the capacitor C. As a result, AC component voltage is applied to the liquid crystal layer of the liquid crystal display panel when the light sensing component LS2 is activated. Thus it is no longer the case that DC component voltage is always applied to that layer. In this way, deterioration of the liquid crystals can be prevented and noise is lessened.

As FIG. 13 shows, in the present embodiment 2 the first and second standard voltage sources $V_{SP}$, $V_{SM}$ supply standard voltage with polarities differing relative to VCOM, namely VCOML+Va and VCOMH−Va respectively, and the absolute value of Va will preferably set at a level equivalent to ½ of the swing VCOMW of the voltage supplied to the common electrode 26. If so, then without providing separate wiring, etc., for generation of the standard voltage Va, it will be possible to create the standard voltage by utilizing the voltage for the common electrode and merely providing circuits for an inversion buffer or similar. Also, in the present embodiment 2 which is similar to embodiment 1, control of the backlight is implemented by sending the output of the light sensing component LS2 to the sensor control component 30 of the backlight control means 1A shown in FIG. 10.

As will be understood from the foregoing descriptions, according to the liquid crystal display devices 1, 1' of the above embodiments of the present invention the light sensing component is designed so as to allow for the voltage for on/off control of the backlight that is applied to the common electrode, thanks to which the light sensing component can be provided on the TFT substrate 2 without providing a separate ground electrode or similar. Moreover, although in the above description of embodiment 1 voltage whose polarity inverts, that is, AC voltage is applied as the common electrode voltage, the design also accommodates the case where DC voltage is applied as the common electrode voltage, and therefore in that case also light sensing will be carried out satisfactorily by the light sensing component.

Further, although the descriptions of the above embodiments are for the case where the TFT photosensor of the light sensing component LS1, LS2 is provided at the inside of the periphery of the TFT substrate 2's display area DA so as to be able to be formed simultaneously with the TFTs that are used as the switching elements of the liquid crystal display panel, the TFT photosensor may alternatively be provided at the outside of the periphery of the display area DA, that is, at the outer edge of the seal material 6, provided that it is in a position where it can sense the external light. Moreover, where there is no need for the TFT photosensor of the light sensing component LS1, LS2 to be formed simultaneously with the TFTs that are used as the switching elements of the liquid crystal display panel, the TFT photosensor may be provided exterior to the liquid crystal display panel and electrically connected via a wiring means separate from the liquid crystal display panel. Doing so will entail an increase in fabrication time and work for such separate photosensor, but will enable the location where the photosensor is installed to be selected at will. Further, in the above embodiments the sensor control component 30, comparison component 33, mode control component 31, threshold memorizer 32 and switching component 34 might alternatively be incorporated in the driver IC of the liquid crystal display device 1. Furthermore, the threshold memorizer 32 need not be provided in the interior of the liquid crystal display device 1; alternatively a configuration could be employed in which the threshold memorizer 32 belongs to an external personal computer or similar, from which initial setting of the liquid crystal display device 1 is executed when the power source of the liquid crystal display device 1 is turned on.

The liquid crystal display device in each of the foregoing embodiments can be converted into a transmissive liquid crystal display device simply by omitting the reflective electrodes $R_0$, and conversely, can be converted into a reflective liquid crystal display device by providing the reflective electrodes so as to extend over the whole of the bottom of the pixel electrodes 12. With a reflective liquid crystal display device, a frontlight will be used in place of the backlight or sidelight.

The invention claimed is:

1. A liquid crystal display device comprising:
a liquid crystal display panel in which a liquid crystal layer is provided between an active matrix substrate and a color filter substrate that has a common electrode, wherein a common electrode voltage that varies in a rectangular pattern with a particular period is applied to said common electrode;
a plurality of transfer electrodes, one of the transfer electrodes being provided in each of corners of a display area and outside of the display area, and the transfer electrodes being electrically connected to each other via a common wire surrounding the display area;
a light sensing component positioned on the active matrix substrate side and opposite to the common electrode on the color filter substrate side of the light sensing component, the light sensing component including
a thin film transistor photosensor that senses external light, the thin film transistor including a source electrode, a drain electrode, and a gate electrode, the drain electrode being connected to the to the common electrode via a ground terminal, the transfer electrode, and a contact material,
a capacitor connected between the source and drain electrodes of the thin film transistor, a first terminal of the capacitor is connected to a standard voltage source via a switch element, while a second terminal of the capacitor is connected to said common electrode, and
the second terminal of the capacitor being connected to the common electrode of the color filter substrate via the ground terminal, the transfer electrodes, and the contact material that connects the active matrix substrate and the color filter substrate, wherein the transfer electrodes and the contact material are outside the display area of said active matrix substrate and are outside an area bounded by a seal material; and
an illuminating means that is controlled according to the output of said light sensing component,
wherein said light sensing component is deployed at the periphery of the display area of said active matrix substrate in one of the corners of the display area and adjacent to a respective transfer electrode, and the voltage that is applied to the common electrode is used for activation of the light sensing component;
wherein a gate electrode voltage that is always lower than the common electrode voltage by an amount corresponding to a reverse bias voltage, and that is varied in a rectangular pattern having the same amplitude as the common electrode voltage, is applied to the gate electrode of said thin film transistor, and wherein during a low level common electrode voltage application period, the switch element is switched on, and wherein after the switch is switched on the first terminal of the capacitor is connected to the standard voltage source via the switch element to charge the capacitor, and wherein the external light can be sensed by detecting an output of the capacitor's voltage at a predetermined period of time after said switch element is subsequently switched off.

2. The liquid crystal display device according to claim 1, wherein said thin film transistor, capacitor and switch element of said light sensing component are integrated on said display panel.

3. The liquid crystal display device according to claim 1, wherein said light sensing component's capacitor is provided inside said display panel, and said switch element is deployed exterior to said display panel.

4. The liquid crystal display device according to claim 1, wherein said photosensor is equipped with a completely shielded photosensor and an unshielded photosensor, and the difference between the outputs, of said completely shielded and said unshielded photosensors is used as the output of said photosensor.

5. The liquid crystal display device according to claim 1, wherein the thin film transistor serving as said photosensor is formed simultaneously during the manufacturing process with the thin film transistors for the liquid crystal display panel formed on said active matrix substrate.

6. The liquid crystal display device according to claim 1, wherein a control means having a threshold memorizer and a comparison component is connected to said light sensing component; such control means enabling operation such that in the regular operation mode the output of said light sensing component and the threshold value stored in said threshold memorizer are compared in said comparison component, and on/off control of said illuminating means is performed according to the results of such comparison, while in the initial setting mode, light serving 'as a standard is shone continuously at said photosensor and the resulting output of said light sensing component is stored in said threshold memorizer.

7. The liquid crystal display device according to claim 6, wherein said threshold memorizer and comparison component are provided inside the driver IC placed at the periphery of said active matrix substrate.

8. A liquid crystal display device comprising:
a liquid crystal display panel in which a liquid crystal layer is provided between an active matrix substrate and a color filter substrate that has a common electrode, wherein a common electrode voltage that varies in a rectangular form with a particular period is applied to said common electrode;
a plurality of transfer electrodes, one of the transfer electrodes being provided in each of corners of a display area and outside of the display area, and the transfer electrodes being electrically connected to each other via a common wire surrounding the display area;
a light sensing component positioned on the active matrix substrate side and opposite to the common electrode on the color filter substrate side of the light sensing component, the light sensing component including
a thin film transistor photosensor that senses external light, the thin film transistor including a source electrode, a drain electrode, and a gate electrode, the drain electrode being connected to the to the common electrode via a ground terminal, the transfer electrode, and a contact material,
a capacitor connected between the source and drain electrodes of the thin film transistor, a first terminal of the capacitor is connected to a first standard voltage source via a first switch element and a second standard voltage source via a second switch element, while a second terminal of the capacitor is connected to said common electrode, and
the second terminal of the capacitor being connected to the common electrode of the color filter substrate via the ground terminal, the transfer electrodes, and the contact material that connects the active matrix substrate and the color filter substrate, wherein the transfer electrodes and the contact material are outside the display region of said active matrix substrate and are outside and area bounded by a seal material; and
an illuminating means that is controlled according to the output of said light sensing component,
wherein said light sensing component is deployed at the periphery of the display region of said active matrix substrate in one of the corners of the display area and adjacent to the respective transfer electrode, and the voltage that is applied to the common electrode is used for activation of the light sensing component,
wherein a gate electrode voltage that is always lower than the common electrode voltage by an amount corresponding to a reverse bias voltage, is applied to the gate electrode of said thin film transistor, and
wherein during a low level common electrode voltage application period, the switch element is switched on, and
wherein alternately with each fixed-length frame period said first or second switch element is switched on, and after the respective switch is switched on the first terminal of the capacitor is connected to the first standard voltage source or second standard voltage source, respectively, to charge said capacitor,
wherein the external light to be sensed by detecting an output of the capacitor's voltage at a predetermined period of time after said first and second switch elements are subsequently switched off.

9. The liquid crystal display device according to claim 8, wherein said thin film transistor, capacitor and switch elements of said sensing component are integrated on said display panel.

10. The liquid crystal display device according to claim 8, wherein said sensing component's capacitor is provided inside said display panel, and said switch elements are deployed exterior to said display panel.

11. The liquid crystal display device according to claim 8, wherein said switch elements are provided inside the driver IC placed at the periphery of said active matrix substrate.

12. The liquid crystal display device according to claim 8, wherein said photosensor is equipped with a completely shielded photosensor and an unshielded photosensor, and the difference between the outputs of said completely shielded photosensor and said unshielded photosensor is used as the output of said photosensor.

13. The liquid crystal display device according to claim 8, wherein the thin film transistor serving as said photosensor is formed simultaneously during the manufacturing process with the thin film transistors for the switching elements of the liquid crystal display panel formed on said active matrix substrate.

14. The liquid crystal display device according to claim 8, wherein said fixed-length frame period is an integer multiple of the vertical scan period in the drive signal for said liquid crystal display panel.

15. The liquid crystal display device according to claim 8, wherein control is implemented so that said first and second standard voltage sources respectively supply standard voltage that is positive and standard voltage that is negative, relative to the voltage applied to said common electrode, and said first and second switch elements apply said positive standard voltage to said capacitor when the voltage supplied to said common electrode is low level, and apply said negative standard voltage to said capacitor when the voltage supplied to said common electrode is high level.

16. The liquid crystal display device according to claim 8, wherein said first and second standard voltage sources each supply a voltage that is intermediate between the high level and low level voltages applied to said common electrode.

17. The liquid crystal display device according to claim 8, wherein a control means having a threshold memorizer and a comparison component is connected to said light sensing component; such control means enabling operation such that in the regular operation mode the output of said sensing component and the threshold value stored in said threshold memorizer are compared in said comparison component, and on/off control of said illuminating means is performed according to the results of such comparison, while in the initial setting mode, light serving as a standard is shone continuously at said photosensor and the resulting output of said light sensing component is stored in said threshold memorizer.

* * * * *